July 29, 1930.  R. B. FAGEOL  1,771,560
SNUBBER FOR VEHICLE SPRINGS
Filed Sept. 14, 1927
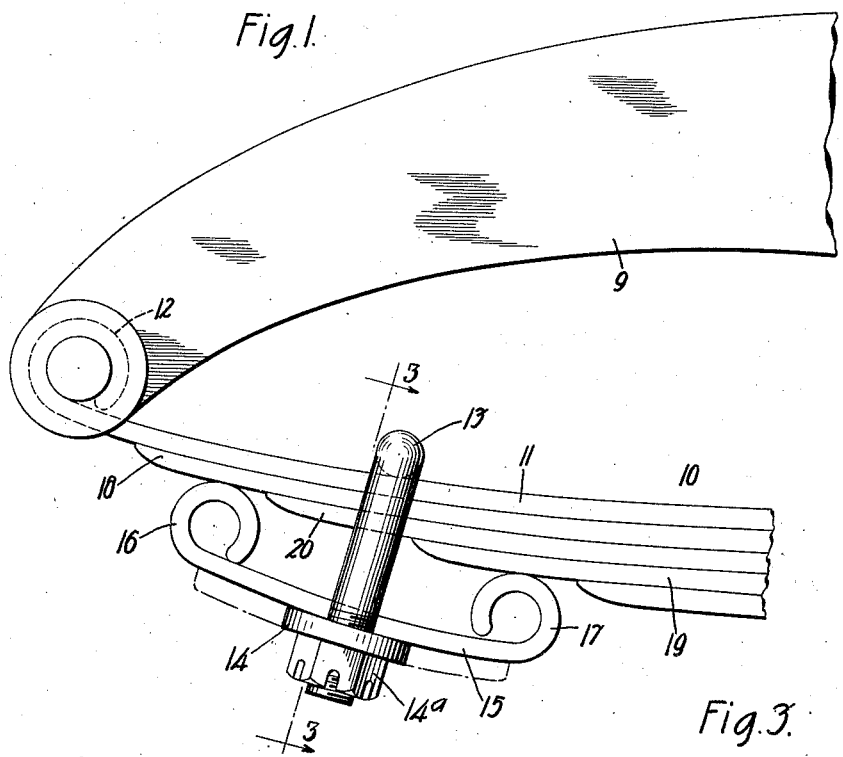
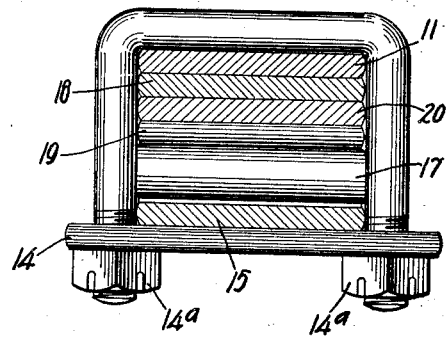
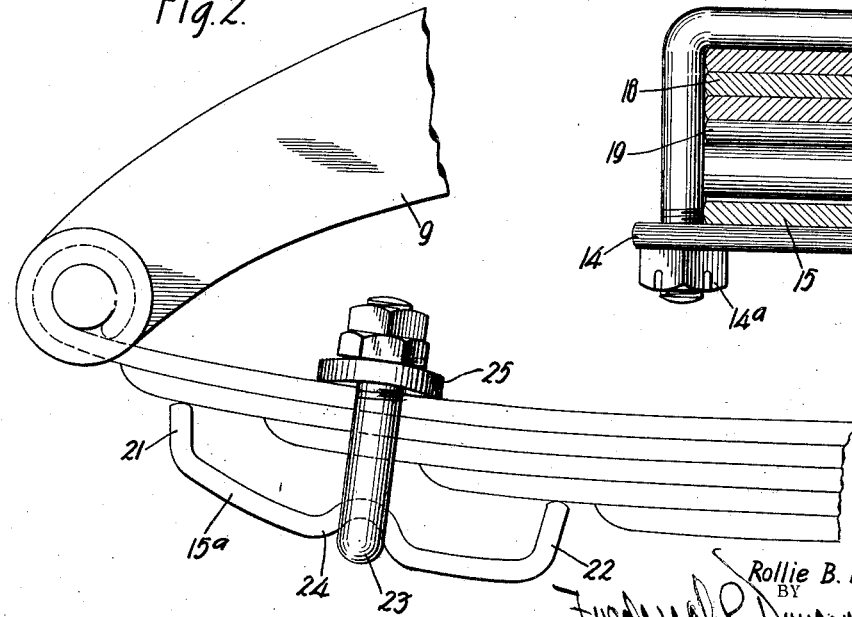
INVENTOR
Rollie B. Fageol,
BY
ATTORNEY Patented July 29, 1930

1,771,560

UNITED STATES PATENT OFFICE

ROLLIE B. FAGEOL, OF LOS ANGELES, CALIFORNIA

SNUBBER FOR VEHICLE SPRINGS

Application filed September 14, 1927. Serial No. 219,415.

This invention relates to vehicle frame suspensions and particularly pertains to the means whereby the leaf springs interposed between the vehicle main frame and its running gear may be acted upon to give the vehicle easier riding qualities.

At the present time various expedients have been used and interposed between a vehicle frame and its running gear to dampen the action of the vehicle springs upon which the frame and vehicle body are mounted or to act in combination therewith in absorbing the initial shock or tending to absorb the rebound shock incident to excessive road impact due to irregularities and the like in the highways as encountered by the wheels of the running gear. In most instances such devices have tended to stiffen the spring action or to create a like result. In the present instance, however, simple means have been provided for effectively increasing the frictional engagement between contacting leaves of the vehicle spring and in addition thereto to obtain some beneficial results from the inherent resiliency of the vehicle spring itself in absorbing minor spring vibrations and tending to effectively resist major spring vibrations.

The present invention contemplates the use of means engaging the main leaf of the vehicle spring on one side and contacting with the opposite side of the spring bundle at two points remote from each other and directly bearing against separate leaves of the spring whereby direct pressure will be exerted against separate leaves of the spring and will thus be transmitted from the respective leaves to the contacting faces between said leaves and the next adjacent leaves whereby frictional resistance will be set up between the leaves. In some instances it might be desirable to obtain a yieldable pressure in addition to the yieldable results obtained by clamping the structure to the spring and having pressure bearing upon the opposite side of the laminated spring structure from the side upon which the structure contacts at two places with the spring and at a point intermediate said contact points.

The invention is illustrated by way of example in the accompanying drawings in which—

Fig. 1 is a view in side elevation showing one form of the present invention and in which form the pressure member possesses inherent resiliency throughout its length.

Fig. 2 is an enlarged fragmentary view showing another form of the invention as disclosed in Fig. 1, but with a slightly different form of pressure bar and the additional provision of a yieldable washer upon the opposite side of the spring from the pressure bar.

Fig. 3 is a view in transverse section through the device as shown in Fig. 1, and indicates the U bolt structure embracing the spring bundle.

Referring more particularly to the drawing, 10 indicates a laminated vehicle spring here shown as being of a semi-elliptical type. This spring is formed with one or more main leaves 11, terminating at their opposite ends in spring eyes 12. The eyes are provided to receive spring shackle bolts by which the spring is connected with the vehicle main frame 9 in some preferred manner. The leaves of the vehicle spring lie one against the other and are of graduated length becoming gradually shorter toward the bottom of the spring bundle. This arrangement, which is a common one, results in causing the ends of the leaves to overlap or the upper leaves to overhang the next succeeding lower leaf and to thus present an overhanging surface of each of the leaves arranged in step formation. During the operation of a vehicle spring the leaves flex in unison but have independent movement with relation to each other which results in a longitudinal sliding action between the contacting faces of the various leaves. It is desirable under certain conditions to increase this longitudinal friction between the leaves but this should not be done in a manner to rigidly clamp all of the leaves together and to thus objectionably limit the frictional movement between the spring leaves which in turn would, in effect, produce the stiff and non-yielding spring except at times when excessive impact is dealt to the vehicle running gear. In order to obtain the aforesaid desirable result of creating additional friction between the leaves without the objectionable binding of the leaves together, the present invention contemplates creating pressure between separate groups of leaves and at different points along the spring which pressure is yieldingly resisted by the spring leaves themselves, and in some instances may also be yieldingly resisted by the incorporation of other resilient members in the snubber construction.

The form of the invention shown in Fig. 1, of the drawings, comprises a U bolt 13, which is disposed near the end of the vehicle spring and projects downwardly along the opposite sides thereof, as shown in Fig. 3. It will be understood that the bolt is of sufficient width to snugly fit the opposite sides of the spring without binding the leaves and without the possibility of rattling. U bolt 13 passes through a cross member 14 which is provided with holes for accommodating the ends of the bolt 13 which are threaded to receive nuts 14ª. The legs of the bolt pass along opposite sides of a pressure bar 15; this bar is here shown as being formed of spring steel and as being of a width substantially equal to the width of the spring leaves. The opposite ends of this bar are curled to form eyes 16 and 17. These eyes are formed upon the upper side of the bar and therefore provide cylindrical surfaces which bear against the overhanging under faces of certain of the vehicle spring leaves. The eye 16, is here shown as bearing against the leaf 18, and thus creating friction between the contacting faces of leaves 11 and 18. The eye 17 is here shown as bearing against a leaf 19, which creates friction between the contacting faces of leaves 19 and 20, and also creates friction between leaves 18 and 20 and 18 and 11. It will therefore be seen that frictional resistance is set up between the faces of relatively large number of leaves at a point where the spring is thick and that other frictional resistance is set up between a relatively small number of leaves at a point where the spring is thin. This outer eye 16 also tends to support the thin end of the spring and to assist this thin end in absorbing excessive shock which might otherwise tend to crack the spring leaves.

In the form of the invention shown in Fig. 2, of the drawing, the pressure bar 15—A is provided with a simple recess portion and upturned rigid ends 21 and 22, which bear against the overhanging exposed ends of certain of the leaves of the spring. A U bolt 23, in this instance, sits against the recessed section 24 of the pressure bar 15—A, and extends upwardly along the opposite sides of the spring and to a point above and beyond the upper spring main leaf. A convexed spring washer 25, is disposed above the main leaf and is perforated at two points to receive the threaded legs of the U bolt; suitable nuts 26 are mounted upon these threaded portions of the bolt and exert pressure against the convexed member 25. In this instance the pressure bar 15—A is preferably formed of resilient material such as spring steel and the convexed member 25 is formed of similar material and for a similar purpose. In fact, in an analysis of the three structures here shown and described, it will be recognized that there are three contact points present in the snubber structures and that two of these points are upon the underside of separate overhanging spring leaves and that the other point of contact is at a point intermediate first named points and upon the opposite side of the spring main leaf; in all of which cases the end section of the vehicle spring will be placed under tension and in addition thereto added frictional contact will be set up between different contacting faces of the various leaves thereby insuring that the effective resiliency and shock absorbing qualities of the spring will not be impaired but that in this manner they may be desirably increased to materially improve the riding qualities of the vehicle.

In operation of the present invention, the pressure members are applied so that their pressure exerting faces are disposed beneath and against separate overhanging ends of spring leaves after which the devices are clamped in position, using the single contact or pressure point upon the main leaf as a fulcrum. Then pressure is exerted upon the vehicle spring to place it in tension and to also suitably tension the pressure bars 15 and 15—A and in some instances the pressure washer 25.

When the spring is then in operation, the pressure bars, without material flexing, will permit the spring to flex although this will be somewhat resisted by the stiffening of the end of the spring and the frictional engagement of the contacting faces of the leaves. When, on the other hand, excessive shock is imparted to the vehicle spring there is a tendency for the spring to straighten. If this straightening force emanates from a point between the contacting point of the structure upon the main leaf and the center of the spring it will be evident that the spring will swing upwardly, exerting pressure against the contact point on the main leaf and at the same time exerting a downward pressure on the outer end of the pressure bar as on the eye 16 in Fig. 1. This tends to increase the pressure exerted against the spring leaves and will thus automatically act to establish additional frictional contact between the leaves, which contact will in effect resist relative longitudinal movement of the leaves and absorb the impact. If, on the other hand, the shock originates at a point in the vehicle body and a downward force is exerted at the eye of the vehicle spring, it will be evident that this force will be transmitted to the spring directly to the eye 16, as shown in Fig. 1, and that this in turn will tend to force the eye 17 upwardly against the leaves and thus increase their friction. In both events there will be set up between the two spaced contact points on one side and the one contact point on the main leaf, an additional force tending to tighten the leaves with relation to each other where under normal conditions these leaves would be comparatively free in their movement.

It will thus be seen that by the means here disclosed a simple device is provided for application to a vehicle spring and by which the minor vibrations of the vehicle spring may be readily absorbed without material resistance, and without affecting the riding qualities of the car, and that major road shock and body vibrations will be automatically resisted by creating conditions in the vehicle spring which were not before present and which permit the spring to function in its intended manner but with gradually increasing resisting qualities.

While I have shown the preferred form of my invention as known to me, it will be understood that various changes might be made in the combination of the construction and arrangement of parts by those skilled in the art, without departing from the spirit of the invention as claimed.

Having thus described my invention, what I claim and desire to secure by Letters Patent is—

1. In combination with a multi-leaf vehicle spring, means of engaging the main leaf spring at a single point upon its upper face; means of engaging separate leaves of the spring at a point on their lower faces; and said first means being capable of creating a binding action upon the embraced portion of the spring and between said points of contact.

2. In combination with a multi-leaf vehicle spring, a snubber therefor, having three contact points arranged in triangular relation to each other, one of said contact points bearing against the upper face of the spring main leaf and the other two said contact points bearing against the overhanging under faces of separate leaves, and said first contact point comprising means for tensioning the portion of the spring substantially bound by the triangular area.

3. In combination with a multi-leaf vehicle spring of the type comprising leaves with normally free ends extending in proximity to each other, a snubber therefor, having three contact points arranged in triangular relation to each other, two of said contact points bearing against the under faces of the overhanging spring leaves and being yieldably connected, and a substantially rigid member connected with said yieldable connection at a point intermediate the contacts and engaging the opposite side of the spring main leaf at the other point of the triangle, the leaf ends embraced by said snubber being otherwise unconfined at the region occupied by the snubber.

4. In combination with a multi-leaf vehicle spring, a snubber therefor, having three contact points arranged in triangular relation to each other, two of said contact points bearing against the under faces of the overhanging spring leaves and being yieldably connected, and a substantially rigid member connected with said yieldable connection at a point intermediate the contacts and engaging the opposite side of the spring main leaf at the other point of the triangle; and means for adjustably tensioning the yielding member against the spring.

5. In combination with a multi-leaf vehicle spring, a snubber therefor having three contact points disposed in triangular relation to each other, one of which contact points rests against the upper face of the spring main leaf, the other two of which contact points bear against the under faces of separate leaves of the spring; and said first mentioned contact point comprising means for creating the binding action between the lower contact points and the upper contact point whereby the intervening spring section will be placed under tension.

6. In combination with a multi-leaf vehicle spring, a U bolt embracing the spring and resting against the upper face of the main leaf and a pressure bar disposed beneath the spring and engaged by the U bolt, said pressure bar contacting with the spring at the opposite ends of the bar and directly bearing against the under overhanging faces of separate spring leaves.

7. In combination with a multi-leaf vehicle spring, a U bolt embracing the spring and resting against the upper face of the main leaf and a pressure bar disposed beneath the spring and engaged by the U bolt, said pressure bar contacting with the spring at the opposite ends of the bar and directly bearing against the under overhanging faces of separate spring leaves, and means for creating a variable pressure against said spring leaves by said bar.

8. In combination with a multi-leaf vehicle spring, a snubber therefor, comprising a resilient pressure bar extending beneath a vehicle spring adjacent to the end thereof, upturned portions formed at the ends of said bar for contacting with the exposed under faces of separate spring leaves and a U bolt embracing the spring and extending down along the opposite sides thereof and engaging the resilient pressure bar whereby said bar may be rigidly held at a desired pressure against the spring leaves with which it contacts and will create friction between the contacting faces of the leaves.

9. A snubbing device for laminated springs, comprising a plate having inturned ends that seat against one side of a spring, a second plate seating against the other side of the spring, and a U-bolt extending around the mid portion of the first named plate and extending through openings in the second named plate, the first named plate being provided with a depressed portion that serves as a seat for the bolt.

10. A snubbing device for laminated springs, comprising a plate having end portions for seating against the exposed face of a lamination, a second plate that is shorter than the first named plate, for seating against the exposed face of a second lamination, and disposed opposite to the mid portion of the first named plate, and means for drawing said plates toward one another.

11. A snubbing device comprising a clamping member for engaging the lamination at one side of a laminated spring, a second clamping member for engaging each of two laminations at the opposite side of the spring, and means for rigidly holding said members in clamping engagement with the said laminations, the first-named member being disposed intermediate of but above the points of engagement of the second-named member.

In testimony whereof, I have signed this specification.

ROLLIE B. FAGEOL.